United States Patent Office 3,168,866
Patented Feb. 9, 1965

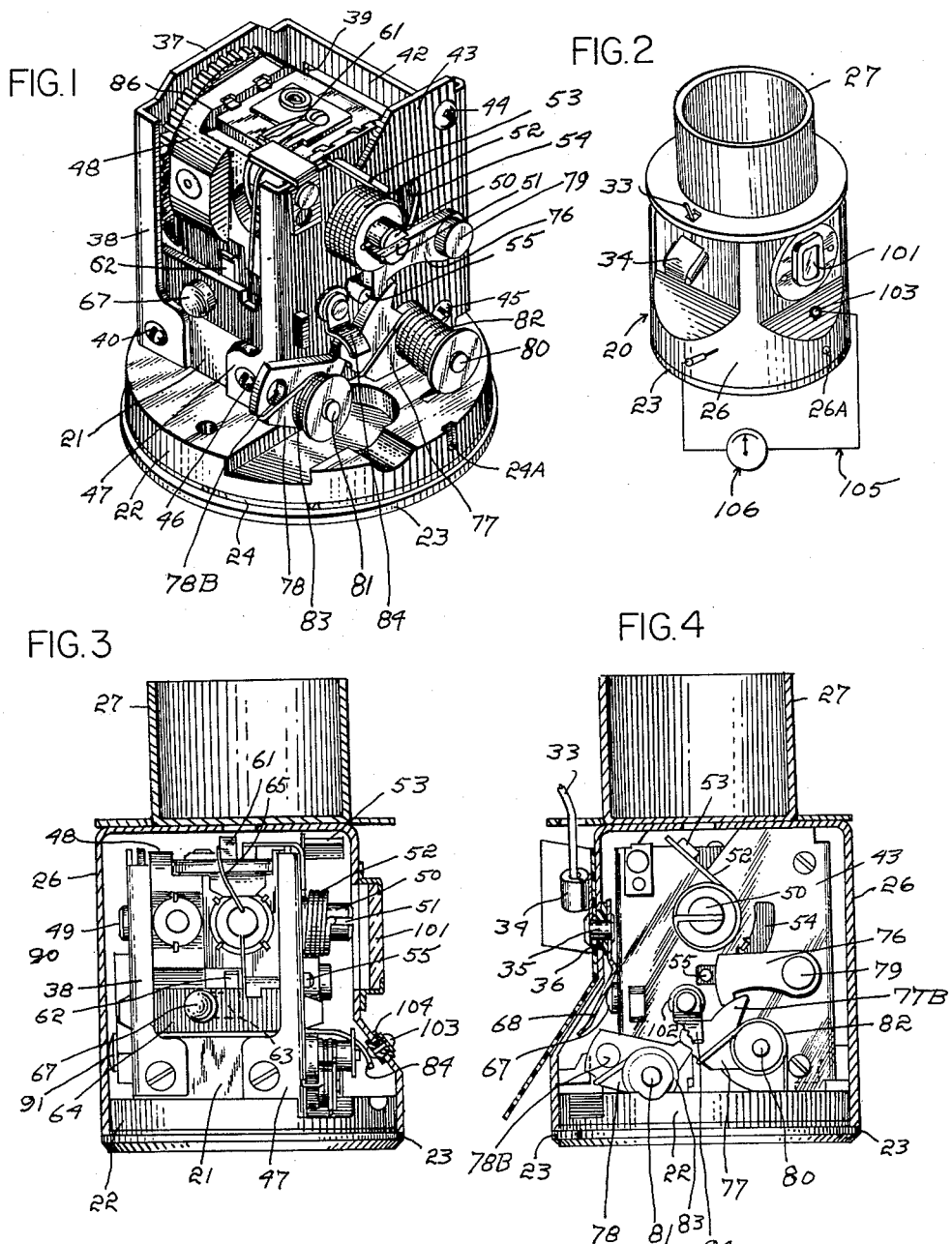

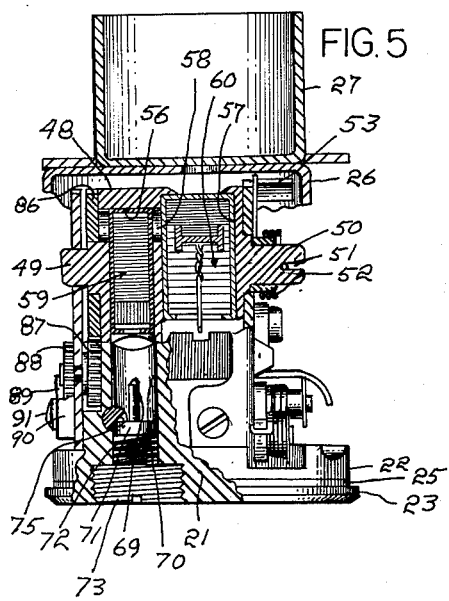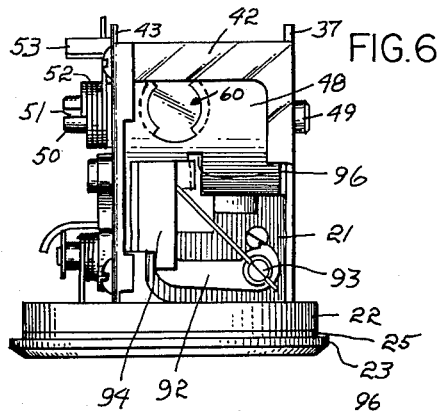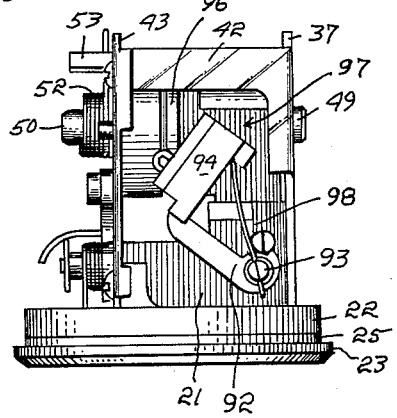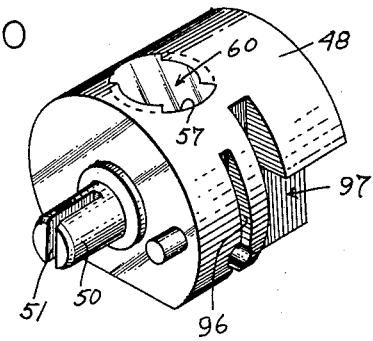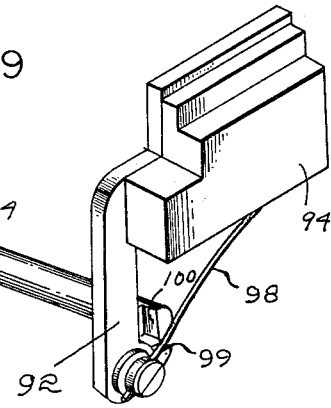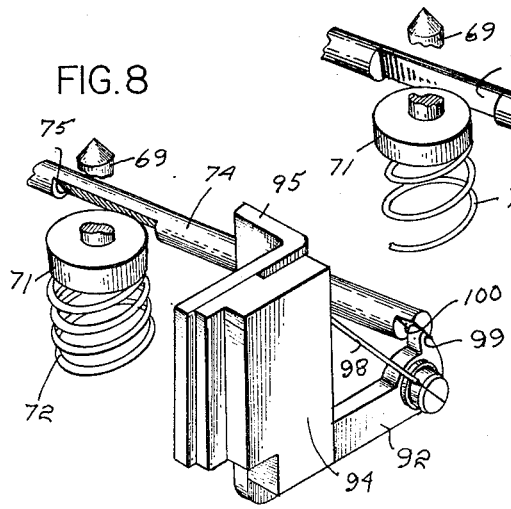

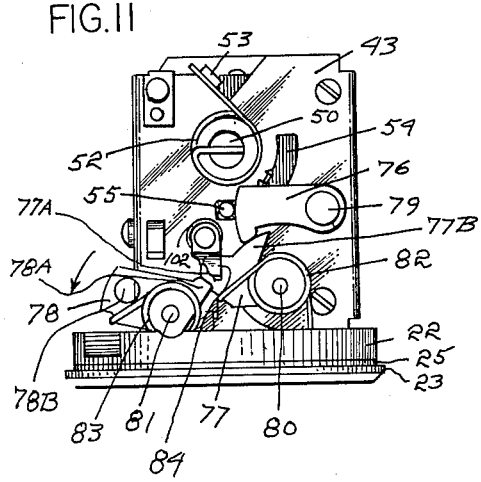
FIG.11
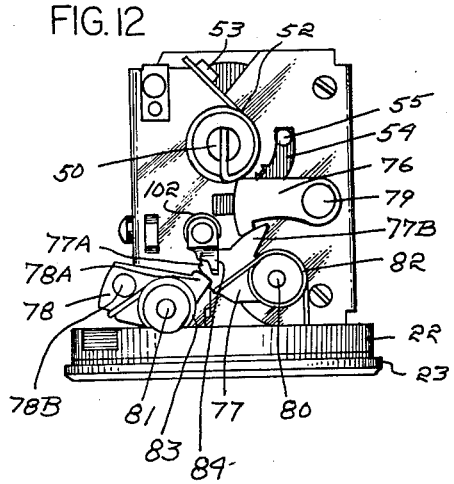
FIG.12
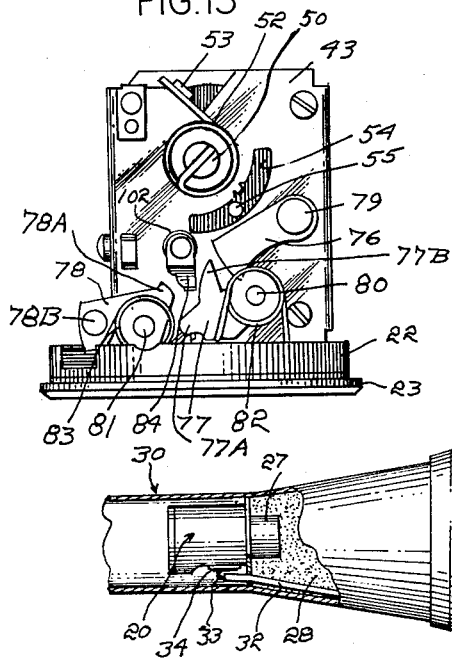
FIG.13
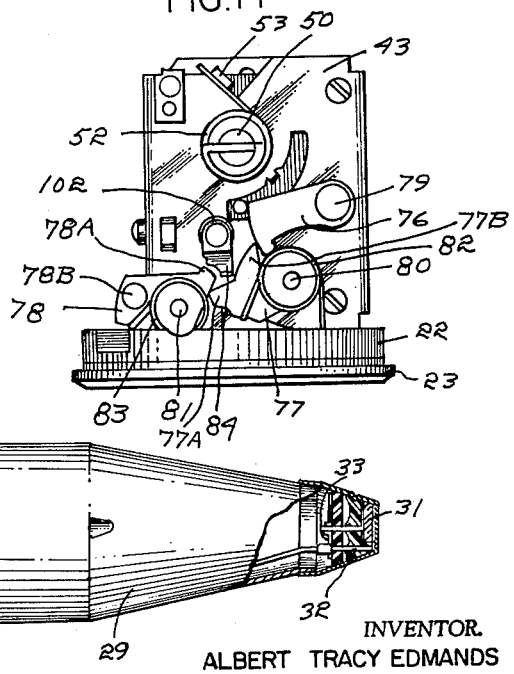
FIG.14
FIG.15
INVENTOR.
ALBERT TRACY EDMANDS
BY
ATTORNEY

3,168,866
FUZES PROVIDED WITH MEANS FOR ELECTRICALLY CHECKING THE SAFETY
Albert T. Edmands, Dover, Mass., assignor, by mesne assignments, to Hesse-Eastern, Inc., Everett, Mass., a corporation of Delaware
Filed July 2, 1962, Ser. No. 206,662
6 Claims. (Cl. 102—76)

The present invention relates to fuzes for missile war heads and particularly to means enabling each such fuzes to be tested to determine whether or not it, and consequently the round of which it is a part, is in a safe unarmed position.

By way of example, one type of fuze used in missiles of the rocket type has a base supporting a member within a cover and carrying a detonator. The member is movable between a safe, unarmed position and an unsafe armed position into which it is positively moved when the holding means are released. While provision is made to enable the position of the member to be visually determined, the holding means are concealed and if such are not in a proper holding position, the visual observation may be a false indication of the condition of the fuze.

The principal objective of the present invention is to provide means enabling the true status of the holding means to be determined as by a checking circuit and this objective is attained, in accordance with the invention, by providing the fuze with an insulated contact which is engaged by and in electrical contact with the holding means when in its operative position and grounded through the fuze. When the cover is attached to the base, the contact is engaged by a connector extending through the wall of the cover and insulated therefrom so that a checking circuit in contact with the conductor and the cover, gives a quick and accurate indication whether the holding means are safely or unsafely positioned.

In this connection, it is to be noted that it is desirable that the holding means be released by set-back, i.e. the force resulting from the acceleration of the missile in flight, in a direction opposite to its direction, in terms both of "G" loads and a time factor in such combinations as to enable safe discrimination to be made between accelerations resulting from an accidental drop of a missile and acceleration resulting when the missile is placed in flight.

Such means include a series of leaves, one being held in its holding position by another. At least one leaf of the series is movable into a releasing position by a predetermined set-back force which depends on a pre-established relationship of the leaves and the position of one leaf relative to the insulated contact is used as that in which a checking circuit may be employed to determine whether the fuze is in a safe, unarmed position.

In the accompanying drawings, there is shown a fuze in accordance with the invention from which these and other of its objectives, novel features, and advantages will be readily apparent.

In the drawings,

FIGURE 1 is a perspective view of the fuze with its cover removed,

FIGURE 2 is a perspective view, on a reduced scale, of the fuze with its cover in place and a test being made as to whether or not it is in a safe condition, FIGURE 3 is a side view of the fuze with the cover being shown in section, FIGURE 4 is a similar view taken at right angles to the position of the fuze in FIGURE 3, FIGURE 5 is a view like FIGURE 3 but with the fuze vertically sectioned, FIGURE 6 is an elevational view of the fuze, with its cover removed and as seen from the side opposite that shown in FIGURE 3, showing the graze operated mechanism in its inoperative position, FIGURE 7 is a like view but with the graze mechanism operatively positioned, FIGURE 8 is a fragmentary and somewhat schematic view showing the safety when the graze mechanism is in the position illustrated by FIGURE 6, FIGURE 9 is a like view showing the safety when the graze mechanism is in the position illustrated by FIGURE 7, FIGURE 10 is a perspective view, on an increased scale, of the rotor.

FIGURE 11 is a view of the fuze as seen in FIGURE 4 but with the cover removed, in both views the fuze being unarmed and safe, FIGURE 12 is a similar view but showing a possible position of certain of the parts when the fuze is armed and unsafe, FIGURE 13 is a similar view with the rotor unlocked and turning towards its unsafe, armed position, FIGURE 14 is a view illustrating the fuze in an unarmed position but unsafe due to the locking leaves being insecurely positioned, and FIGURE 15 is a somewhat schematic view of a rocket incorporating a fuze of the type shown.

The generally indicated fuze 20 illustrated by the drawings has a base 21, see FIGURE 1, formed with a protruding cylindrical shoulder 22 provided with a marginal flange 23 and a channel 24 for a sealing ring 25. A cover or housing 26, see FIGURE 2, has, at one end, a booster cavity 27 and its other end is dimensioned to fit over the shoulder 22 and to seat against the flange 23 when the cover projections 26A are entrant of the base recesses 24A.

The fuse 20 is shown as of the type used to detonate the charge 28 of the war head 29 of a generally indicated rocket 30. The rocket 30 is shown in FIGURE 15 as of the type including in its nose a piezo-ceramic body 31 having leads 32 and 33 in electrical contact with opposite faces thereof, the lead 32 being a grounded tubular conductor and the lead 33 extending rearwardly therethrough and attached to the connector 34 carried by the outer end of a conductor 35 in the form of a rivet which extends into the cover 26 through an insulator 36. See FIGURE 4.

A wall 37, as may best be seen in FIGURE 1, has side flanges 38 and 39 with the side flange 38 attached to the base 21 by a screw 40 with the side flange 39 having an arm-like extension 42 to which an opposite wall 43 is connected by a screw 44. The wall 43 is also secured to the base 21 adjacent one side by a screw 45 and by a screw 46 extending through the flange 47 at the opposite side of the wall 43.

A rotor 48, see FIGURES 1, 3, and 10, has stub shafts 49 and 50 rotatably supported by the walls 37 and 43, respectively, with the shaft 50 having a transverse, open-ended slot 51 in which one end of a coil spring 52 is caught. The other end of the spring 52 is held by spring tension against the stop 53 with which the wall 43 is provided.

The wall 43 has a slot 54 that is arcuate with respect to the axis of the rotor 48 which has an end stud 55 entrant thereof. By means presently to be described, the stud 55 is held in the safe or unarmed position shown in FIGURES 1, 4 and 11 and, when released, the spring 52 is operative to turn the rotor 48 until the stud 55 engages the other end of the slot 54 to establish an unsafe, armed position of the rotor 48, see FIGURE 12.

The rotor 48, see FIGURE 5, has transverse bores 56 and 57 interconnected by the passage 58, the bore 57 extending transversely through the rotor. Detonators 59 and 60 are located in the bores 56 and 57, respectively. The detonator 59 is of the primer type while the detonator 60 is of the type that is electrically ignited, such ignition being possible only when the contact 61, see FIGURES 1 and 3, on the rotor 48 engages the contact end 62 of the conductor 63 on the insulator 64 supported by the walls 37 and 43, such engagement occurring when the rotor 48 is in its unsafe or armed position. The contact 61 is connected by the lead 65 to the detonator 60, the ground from which is indicated at 66. The conductor 63 has a contact 67 engaged by the resilient arm 68 on the inner end of the connector 35 when the cover 26 is in place, see FIGURE 4.

The primer 59 is of the type ignited as by means of the firing pin 69 located in a bore 70 in the base 21, see FIGURE 5. The firing pin 69 has a head 71 backed by a spring 72 held under operating tension by the plug 73 threaded in the bore 70. The pin 69 is held against movement from its inoperative position by the rotatable safety 74, see also FIGURES 8 and 9, which is disposed in the base 21 transversely of the axis of the bore 70 and provided with a cut-out providing a flat face 75 which is disposed in diagonal contact with the periphery of the head 71 in a position such that when the safety is turned, the firing pin 69 is freed. Even when thus freed, the firing pin 69 cannot explode the primer 60 until the rotor 48 has turned into its unsafe, armed position in which the primer 59 is exposed at the end of the bore 70. The safety 74 is prevented from turning by graze operated means presently to be detailed.

Referring now to the means normally preventing the turning of the rotor 48, hereinafter sometimes referred to as the set-back assembly, it will be noted, see FIGURES 1, 4, and 11–14 that there are first, second and third leaves 76, 77, and 78, respectively, mounted on the wall 43 by pivots 79, 80, and 81, respectively. The second leaf 77, and the third leaf 78 are yieldably maintained in their operative position by means of coil springs 82 and 83, respectively, by which they are urged into an inoperative safe position in which the leaf 77 is seated against a stop 84.

When set-back occurs, as when the rocket accelerates as it is launched, the leaves 77 and 78 swing in the direction of the arrow in FIGURE 11 until, as may be seen in FIGURE 13, the leaf shoulder 78A disengages from the leaf shoulder 77A and the leaf shoulder 77B no longer blocks the swinging of the first leaf 76 thus unblocking the slot 54 with the result that the rotor 48 is turned by the action of the coil spring 55 into its operative armed position, see FIGURE 12. It will be noted that the leaf 78 has an aperture 78B formed therein so that it is substantially lighter than the leaf 77 and responds only to a set-back force of a "G" load and a time factor combination that cannot result from an accidental drop. In practice, see FIGURES 1 and 5, the rotor 48 has a gear 86 which meshes with a gear 87 whose shaft is supported by the wall 37 and includes a gear 88 engaged alternately by the escapement arms 89 and 90 pivoted to the wall 37 as at 91.

A difficulty with such a fuze is that, while it functions reliably on a direct hit since the crystal 31 is then crushed to generate a fuze firing pulse, if it grazes the target, no electric pulse will be generated and in order to prevent failure in that event, a graze responsive means, see FIGURES 6–9, is used that includes an arm 92 pivoted as at 93 to the mount 21 between the walls 37 and 43 and provided with a weighted head 94 having a flange 95 normally entrant of the annular groove 96 with which the rotor 48 is provided so that it is held therein until the rotor 48 is in its unsafe, armed position in which a relieved area 97 is presented which permits the escape of the head 94 and the swinging of the arm 92 against the action of the spring 98. The arm 92 has a stop 99 which normally engages the end shoulder 100 of the safety 74 but after it has swung, it is disengaged therefrom, permitting the safety to be turned out of the way by the action of the firing pin spring 72. When a target is grazed, the weighted head 94 swings and releases the safety 74, the firing pin 69 then striking the primer 59.

By these means, firing of the fuze is assured on either a direct or a graze hit of the missile and if the various parts are properly assembled, the fuze prevents accidental arming, requiring, first, set-back to release the rotor 48 so that it may turn from its safe to its unsafe position and then a direct or graze hit to cause the war head to be detonated.

It is, of course, essential to know, for the sake of safety, that the parts are properly positioned for otherwise accidental detonation of the war head might result and it has been the practice to provide each cover 26 with a sealed window 101 through which the slot 51 in the end of the stub shaft 50 is visible, see FIGURES 2 and 3. When the slot 51 is in position, shown in FIGURES 11 and 14, the rotor 48 is in its unarmed or safe position while, if it is in the position shown in FIGURE 12, the fuze is armed and unsafe.

It is possible, however, for the rotor 48 to be in its safe position without actual safe conditions existing. By way of example, the stud 55 may be insecurely held by improperly positioned leaves as suggested by FIGURE 14 so that a relatively slight jar might free it.

In accordance with the invention, the stop 84, see FIGURES 1 and 3, is a contact and is insulated from the wall 43 as at 102. The cover 26 has a rivet 103 extending through its wall and insulated therefrom as at 104 and, when the cover 26 is assembled on the base 21, the inner end of the rivet 102 engages the contact stop 84 which is engaged by the second leaf 77 if it is in its holding position.

If the rivet 103 and accordingly the contact stop 84 and the cover 26 are placed in a circuit 105 including, for example, a galvanometer 106, current will flow only if the second leaf 77 is in a safe or holding position so that the safety of the fuze may be quickly, easily, and accurately checked.

I claim:

1. In a fuze for a projectile, a base, a member carried by said base for movement between first and second positions, said member including a detonator, means operative to explode said detonator when said member is in said second position, means to move said member from said first to said second position, releasable means to hold said rotor in said first position, an insulated contact engageable by and in electrical contact with said holding means when said holding means is in holding position, a cover attached to said base and in electrical contact therewith, and a connector carried by and extending through said cover and insulated therefrom, said connector and said contact being in engagement when said cover is attached to said base thereby to permit the checking as to the safety of said fuze by placing said fuze in a checking circuit including said housing and said connector.

2. In a fuze for a projectile, a base, a member carried by said base for movement between first and second positions, said member including a detonator, means operative to explode said detonator when said member is in said second position, means to move said member from said first to said second position, releasable means to hold said rotor in said first position, said means being releasable by the set back thereof due to the acceleration of the projectile in flight, an insulated contact engageable by and in electrical contact with said holding means when said holding means is in holding position, a cover attached to said base and in electrical contact therewith, and a connector carried by and extending through said cover and insulated therefrom, said connector and said contact being in engagement when said cover is attached to said base thereby to permit the checking as to the safety of said fuze by placing said fuze in a checking circuit including said housing and said connector.

3. In a fuze for a projectile, a base, a member rotatably carried by said base to turn between first and second positions, said member including a detonator, means operative to explode said detonator when said member is in said second position, spring means to turn said member from said first to said second position, releasable means to hold said rotor in said first position, an insulated contact engageable by and in electrical contact with said holding means when said holding means is in holding position, a cover attached to said base and in electrical contact therewith, and a connector carried by and extending through said cover and insulated therefrom, said connector and said contact being in engagement when said cover is attached to said base thereby to permit the checking as to the safety of said fuze by placing said fuze in a checking circuit including said housing and said connector.

4. In a fuze for a projectile, a base, a member rotatably carried by said base to turn between first and second positions, said member including a detonator, means operative to explode said detonator when said member is in said second position, spring means to turn said member from said first to said second position, releasable means to hold said rotor in said first position, said means being releasable by the set back thereof due to the acceleration of the projectile in flight, an insulated contact engageable by and in electrical contact with said holding means when said holding means is in holding position, a cover attached to said base and in electrical contact therewith, and a connector carried by and extending through said cover and insulated therefrom, said connector and said contact being in engagement with said cover is attached to said base thereby to permit the checking as to the safety of said fuze by placing said fuze in a checking circuit including said housing and said connector.

5. In a fuze for a projectile, a base, a member carried by said base for movement between first and second positions, said member including a detonator, means operative to explode said detonator when said member is in said second position, means to move said member from said first to said second position, releasable means to hold said rotor in said first position, said means including three pivoted leaves, each disposed to swing when subjected to the force attendant acceleration of the projectile in flight, the first leaf being the holding leaf, the second leaf locking said first leaf, and the third leaf locking said second leaf until swung by said force, an insulated contact engageable by and in electrical contact with said second leaf in its holding position, a cover attached to said base and in electrical contact therewith, and a connector carried by and extending through said cover and insulated therefrom, said connector and said contact being in engagement when said cover is attached to said base thereby to permit the checking as to the safety of said fuze by placing said fuze in a checking circuit including said housing and said connector.

6. In a fuze for a projectile, a base, a member carried by said base for movement between first and second positions, said member including a detonator, means operative to explode said detonator when said member is in said second position, means to move said member from said first to said second position, releasable means to hold said rotor in said first position, an insulated contact engageable by and in electrical contact with said holding means when said holding means is in holding position, a cover attached to said base and in electrical contact therewith, and a connector carried by and extending through said cover and insulated therefrom, said connector and said contact including, on its inner end, a resilient arm engaging said contact when said cover is attached to said base thereby to permit the checking as to the safety of said fuze by placing said fuze in a checking circuit including said housing and said connector.

References Cited in the file of this patent
UNITED STATES PATENTS

| | | |
|---|---|---|
| 2,486,362 | O'Brien | Oct. 25, 1949 |
| 2,853,011 | Will et al. | Sept. 23, 1958 |
| 2,496,316 | Skinner et al. | Feb. 7, 1960 |
| 3,052,784 | Ousley | Sept. 4, 1962 |